RANDOLPH. E. SABIN.
Improved "Fish Nursery"
No. 116995
Patented Jul 11 1871
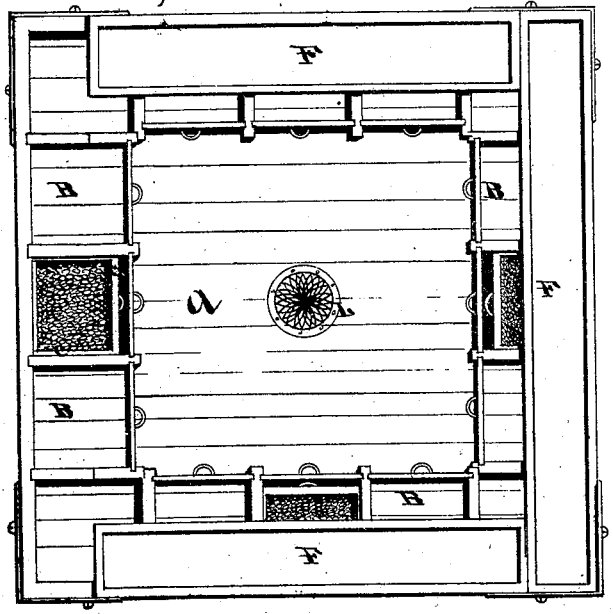
Fig. I.
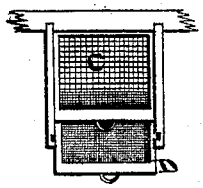
Fig. III.
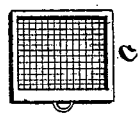
Fig. IV.
Fig. V.
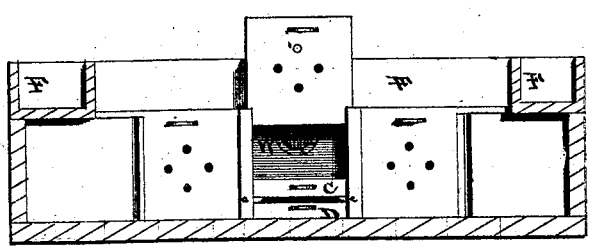
Fig. II.
Witnesses:
E. S. Seymour
Wm. B. Parker
Inventor:
Randolph E. Sabin
by his Attorneys
Gardner & Hyde

UNITED STATES PATENT OFFICE.

RANDOLPH E. SABIN, OF WEST SPRINGFIELD, MASSACHUSETTS.

IMPROVEMENT IN FISH-NURSERIES.

Specification forming part of Letters Patent No. 116,995, dated July 11, 1871.

*To all whom it may concern:*

Be it known that I, RANDOLPH E. SABIN, of West Springfield, Hampden county, Commonwealth of Massachusetts, have invented a Nursery for Rearing Fish, of which the following is a specification:

The first part of my invention relates to providing a compartment for a pair of fish, which compartment contains removable screens, into one of which the eggs are spawned, while another screen below receives the spawn and is closed by a sliding door so as to prevent access from outside fish; the object of this part of my invention being to protect the fish spawning from the attacks of other fish, who would else drive them off and eat the eggs, and also to enable the lower screen containing the eggs to be withdrawn without the necessity of disturbing the other, and to enable both screens to be withdrawn to leave a suitable place for the seclusion of young fish. The second part of my invention relates to the combination of one or more of these compartments with the tank or race connecting with or constituting the pond and the hatching-troughs, the compartments being arranged around the sides of the tank, and having the hatching-troughs resting above them, the whole constituting a nursery in compact form, and occupying no more space than that ordinarily given to the hatching-house alone.

Figure I is a plan view showing one hatching-trough removed. Fig. II is a cross-sectional view; and Fig. III is a detail view of one of the compartments with the door removed, showing the position of the screens.

A is the cistern, the depth and size of which are a matter of convenience, or are regulated by the kind of fish for which it is designed. Arranged upon its sides are the compartments B B, &c., and resting upon these compartments B B, &c., are the hatching-troughs F F, &c. L is the sieve over the aperture supplying water, and W the opening, covered also with a sieve, through which the water finds egress.

Most fish, and invariably trout, seek a gravel bed upon which to spawn, and the bottom of the tank A being perfectly bare, and the compartments open, as shown in Fig. III, the fish seek in pairs the screens filled with gravel within said compartments, the female making a funnel-shaped opening in the gravel as far as she can go—that is, through the gravel to the face of the screen, baring generally several of the meshes through the screen, which are large enough to permit the eggs which she then deposits to fall through to the screen D beneath, the meshes of which are small enough to retain and hold the eggs. The gravel-screen C rests upon cleats c on the side of the compartments, so that the screen D can be withdrawn from beneath it with the eggs, and, having its sides of wood, immediately floats to the surface of the water, so that the eggs can be conveniently transferred to the hatching-troughs. The door, as seen in Fig. III, being open, and a pair of fish having found their way to the inside of the compartment, the door is closed to protect them while spawning and opened to permit other pairs to enter, and when both screens are withdrawn compartments are left in which to raise the young fish of different ages.

The method of raising fish in common use consists in having a race connected with the fish-pond, and screens of the same width as the race are let down into it, the lower one to catch the eggs being held in place by the one containing the gravel resting directly upon it, which method is attended with the following inconveniences: In order to get at the lower screen containing the eggs it was necessary to raise with considerable labor the heavy gravel-screen. The fish were unprotected while spawning, and many of them driven to the deeper parts of the pond to spawn, where the eggs were entirely lost, or else the spawn in the screens liable to be eaten by other fish; and all the operations connected with the management of the screens had to be conducted in the open air, and at a season when both the atmosphere and the water were at a low temperature; but in my improved nursery not only are all the eggs saved with little trouble, but, by the compact arrangement of the parts, it may be covered in by a roof, and in a moderately warm room.

What I claim is—

1. Combined with the side of fish-tank A, one or more compartments, constructed substantially as shown and described, containing the screens C and D, and having the removable door.

2. The combination, forming a complete nursery, of the tank A, compartments, and hatching-troughs, substantially as and for the purpose shown and described.

RANDOLPH E. SABIN.

Witnesses:
R. F. HYDE,
EDWARD MORRIS.